May 21, 1963     C. K. STEDMAN     3,090,238

MOTION SENSING DEVICE

Filed May 11, 1960     2 Sheets-Sheet 1

INVENTOR.
CECIL K. STEDMAN
BY Philip Subkow
ATTORNEY

May 21, 1963 C. K. STEDMAN 3,090,238
MOTION SENSING DEVICE

Filed May 11, 1960 2 Sheets-Sheet 2

INVENTOR.
CECIL K. STEDMAN
BY Philip Subkow
ATTORNEY.

United States Patent Office

3,090,238
Patented May 21, 1963

3,090,238
MOTION SENSING DEVICE
Cecil K. Stedman, Enumclaw, Wash., assignor to Statham Instruments, Inc., Los Angeles, Calif., a corporation of California
Filed May 11, 1960, Ser. No. 28,440
32 Claims. (Cl. 73—515)

This invention relates to motion sensing means, and particularly to accelerometers in which a solid mass is suspended on a yieldable constraint and is immersed in a damping liquid. It is particularly directed to such systems in which the damping force in whole or in part arises from the motion of liquid through passageways, as a result of the displacement of the mass on the yieldable constraint.

As is well known, the natural frequency of an undamped mass suspended on a spring restraint is given by the following relationships:

$$w_n = 2\pi f_n = \left(\frac{K}{M}\right)^{1/2} \quad (1)$$

where $w_n$ is the angular natural frequency in radians per second, $f_n$ is the natural frequency in cycles of oscillation per second, K is the spring constant of the constraint, i.e., the ratio of the force applied to the displacement ($x$) of the mass, and M is the mass. This mass is herein referred to as the suspended mass of the system.

When such as mass undergoes forced vibration by a sinusoidally applied force, the displacement, i.e., the response, increases as the frequency increases and approaches infinity as the applied frequency approaches the above natural frequency. At this frequency the response of the mass to the applied sinusoidal force has fallen 90°, i.e., a quarter wave length behind the sinusoidal input variations, i.e., a phase shift of 90° has occurred. This frequency may thus be named the undamped natural frequency.

In order to limit the displacement, a damping force is employed. Thus, for example, a liquid dashpot is associated with the mass to introduce a restraining or damping force.

In a well known configuration, this is obtained by suspending the mass in an opening and providing a peripheral gap between the walls of the opening and the mass. The mass is enclosed in a case containing liquid which fills the gap. Such systems may be termed to be damped systems, with one degree of freedom.

In this specification the frequency of the damped system at which the phase shift is 90° will be referred to as the natural frequency, and will also be identified by the symbol ($f_n$).

In my previous application Serial No. 826,325, filed July 10, 1959, of which this application is a continuation-in-part, I described modifications of such systems of one degree of freedom, in order to produce systems in which the motion of the mass is damped and the natural frequency is but a fraction of the natural frequency of the undamped system. The natural frequency may be said to be degraded in that the natural frequency of the damped system of the invention of said application is substantially less than the natural frequency of the undamped system employing the same mass and spring suspension, that is, the system with the damping liquid removed. This is accomplished by providing an auxiliary passageway in addition to the peripheral gap, whereby the liquid moves in parallel through the auxiliary passageway and the peripheral gap on oscillation of the mass upon its spring suspension. Such passageways are herein referred to as parallel passageways. The natural frequency and damping characteristics of such systems depend in large part on the design of the peripheral gap and the auxiliary passageways, as well as upon the kinematic viscosity of the liquid employed as the damping fluid.

The damping ratio in such a system depends in part on the viscosity of the oil, as well as on the design of the passageways. Thus, for instruments, i.e., any fixed passageway design, the damping ratio may decrease as the viscosity decreases, pass through a minimum, and then increase as the viscosity decreases. Since such viscosity changes occur as a result of temperature changes, damping ratio may thus also vary with changes in temperature.

I may obtain the desired reduction in the natural frequency and obtain damping ratios such as are obtainable by the parallel passageway system by employing a third passageway which is in series with the parallel passageways. I may in such device obtain a lesser variation in the damping ratio with changes in temperature, than may occur in such parallel passageway systems, by so designing the series passageway that its cross sectional area varies inversely to the change in temperature. The auxiliary passageway and the peripheral gap which is in parallel therewith are herein referred to as the parallel passageways, and the peripheral gap referred to as the parallel gap. The series passageway may also be formed between an external surface of the suspended mass and the case structure in which it is contained. This gap is termed the series gap.

The liquid flows through the series gap and then in parallel through the parallel gap and auxiliary passageways, or first through the parallel passageways and then through the series gap, depending upon the direction of flow of the liquid.

I may, by making the parallel gap of such small dimensions that it does not have any substantial influence on the overall damping characteristics of the system, make the damping ratio of the system dependent upon the flow resistance of the series gap and the auxiliary passageway. The system will thus have the response characteristics and damping ratios of a one degree of freedom system and may have the frequency degradation characteristics of the parallel passageway systems of my prior application. In order to proportion the resistances of the series and parallel gap and the auxiliary passageways to direct the flow of the damping fluid primarily through the series gap and the auxiliary passageway, I make the parallel gap narrow or longer than the series gap and preferably also make the parallel gap narrower than the series gap. Sometimes geometry and restrictions on the length of the auxiliary passageway imposes restrictions on the length parallel passageway, requiring that the larger flow resistance of the parallel gap as compared with either other passageways be obtained by narrowing the gap. Thus, for example, and not as a limitation of my invention, the resistance of the parallel gap may be about 5 to $10^2$ times the flow resistance of the parallel gap and auxiliary passageway for parallel flow therethrough, under steady state flow. In such case there is but a minor flow of fluid through the parallel gap.

I have also found that I may, by such design, employ oils of such lower viscosity than in the parallel passageway systems of my prior application and obtain like damping ratios.

The fractional change in viscosity with temperature with such lower viscosity oils is less than with oils of higher viscosity of like chemical constitution. Thus, this also, as I have found, assists in reducing the temperature dependence of the damping ratios obtained by employing such oils.

By designing the series gap so that it becomes narrower as the temperature increases and wider as the temperature decreases, I may obtain a compensation for variations in viscosity and thus obtain a further stabilization of the damping ratio. By designing the series gap and the auxiliary passageways such that the resistance of the series gap is much greater than that of the auxiliary passageways, the variation in resistance of the series gap will permit of a control of the damping ratio, as will be more fully described below.

In order to obtain the above results, I design the series gap and the parallel gap and the auxiliary gap so that the series gap and the parallel gap are primarily resistive in character, while the auxiliary passageway is primarily inertial in character. I also make the peripheral gap of substantially greater resistance to flow than that of the series gap.

The resistive and inertial characteristics of the several passageways depend upon the following characteristics of the passageways.

When the mass moves in oscillatory motion on the spring suspensions while immersed in the liquid, the liquid moves through each of the passageways in oscillatory flow.

The impedance to the oscillatory flow in any of the passageways described above is given by the following relationship:

$$Z = R + jw\left(\frac{M}{A^2}\right) \quad (2)$$

or $$Z = R + jX \quad (3)$$

Where Z is the impedance to flow, R is the resistance component of the impedance, $w$ is the angular frequency of oscillatory flow of liquid; where M is the effective mass of the fluid undergoing oscillatory flow in the passageway whose cross-sectional area is A and $j$ is $(-1)^{1/2}$. In an analogy to electrical terminology, the imaginary term may be referred to as the reactance component of the impedance. The ratio of the resistive component to the reactive component is $R/X$. Both M and R vary with the value of $w$. We may express the values of M and R for very low values of $w$, i.e., as $w$ approaches zero, as $M_1$ and $R_1$. The ratio of the values of R and M respectively to the values of $R_1$ and $M_1$ are each a function of frequency, all other parameters remaining constant, and depend on the value of a term "$Ba$" or "$Bd$," to be described below.

In the tubular auxiliary passageway these ratios depend on the value of a parameter "$Ba$," and in the series and parallel gap on a parameter "$Bd$," wherein $$B = \left(\frac{w}{2v}\right)^{1/2} \quad (4)$$

where "$v$" is the kinematic viscosity in stokes, and "$w$" is the angular frequency equivalent to the natural frequency, i.e., $2\pi f_n$.

For circular tube, "$a$" in the parameter "$Ba$" is the radius of the tube in centimeters. The equivalent value of "$a$" for orifices and passageways that are not of circular cross-section may be obtained by measuring the value of the resistive and the reactive component of the impedance of the non-circular tube. The value "$a$" for the non-circular tube herein referred to as the equivalent radius is taken as the radius of a circular tube which has the same ratio of the resistive to the reactive component of the impedance. For an annular gap whose radius is large as compared with the width of the annulus, "$d$" may be taken as substantially equal to the width of the annulus measured in centimeters.

The variation of the ratios of $M/M_1$ and $R/R_1$ depends not only on "$B$" but also on "$a$" and on "$d$." The ratio of the resistive component of the impedance of the gap to the reactive component of the impedance of the gap, symbolized by $R_g/X_g$ for the gap in question, is given by the following equation:

$$R_g/X_g = 0.2(Bd)^2\left(\frac{M}{M_1} \cdot \frac{R_1}{R}\right) \quad (5)$$

Where $M/M_1$ and $R_1/R$ relate to the gap in question at the value of "$Bd$."

I desire to employ in the gaps values of "$Bd$" wherein the resistive component is not less than the reactive component, and preferably, as will be stated more fully below, where the resistive component is substantially greater than the reactive component of the impedance.

When the ratio of $R_g/X_g$ is 1, the value of $$M/M_1 \times R_1/R$$

is equal to one and "$Bd$" is equal to $(5)^{1/2}$. For all values of "$Bd$" less than 2.24, the ratios $M/M_1$ and $R_1/R$ may for all practical purposes be taken as equal to unity. Thus, the ratio of the resistive component to the reactive component at all values of "$Bd$" less than 2.24 is given by the following expression:

$$X_g/R_g = 0.2(Bd)^2 \quad (6)$$

The smaller the value of "$Bd$" below 2.24, the greater will be the relative value of the resistive component compared to the reactive component. Similarly, the ratio of the resistive component to the reactive component of the tubular auxiliary passageway $(R_t/X_t)$ is given by the following expression:

$$X_t/R_t = \frac{1}{3}(Ba)^2\left(\frac{M}{M_1} \cdot \frac{R_1}{R}\right) \quad (7)$$

Where M, $M_1$, $R_1$ and R relate to the tubular passageway and $$\frac{M}{M_1}$$

and $$\frac{R_1}{R}$$

are the values at the value of "$Ba$" selected.

The relationship for $X_t/R_t$ as a function of "$Ba$" is given in the following table, and may be derived from the curve FIG. 12 of my copending application, which is herewith incorporated by this reference. The values of the above ratio as a function of "$Ba$" is given in the following table.

| $Ba$ | Reactance/Resistance | $Ba$ | Reactance/Resistance |
|---|---|---|---|
| 1.0 | .333 | 4.0 | 3.43 |
| 1.5 | .735 | 4.5 | 3.94 |
| 2.0 | 1.25 | 5.0 | 4.45 |
| 2.5 | 1.80 | 6.0 | 5.5 |
| 3.0 | 2.38 | 8.0 | 7.5 |
| 3.5 | 2.93 | 10.0 | 9.6 |

Since, as has been stated previously, I prefer to employ a parallel gap of such high value of resistance that substantially the entire flow of liquid is through the series gap and the auxiliary passageway, the resistance and reactance which influence the damping are substantially entirely that of the series gap and the auxiliary passageway. The damping ratio "$h$" is in such systems equal to one-half of the ratio of the sum of the resistance of the tubular auxiliary passageway and the resistance of the series gap $(R_g + R_t)$, divided by the sum of the tube reactance and the gap reactance $(X_g + X_t)$; i.e., $$h = \frac{1}{2}\left(\frac{R_g + R_t}{X_g + X_t}\right) \quad (8)$$

measured in similar units, for example, acoustic ohms (pressure drop per unit flow rate).

As stated above, I desire that the value of $R_g$ shall be substantially larger than $R_t$, and to make the value of $X_t$ substantially larger than $X_g$. By so doing, I may, as stated above, vary the spacing of the width of the series gap as the temperature changes to substantially and, in the ideal case completely, compensate for changes in viscosity as the temperature changes. I thus minimize the variation of the damping ratio as temperature changes and obtain a substantially constant value of "$h$." This I may do by the improvements of my present invention without substantially affecting the natural frequency of the damped system.

For systems showing a natural frequency as defined herein, this damping ratio ($h$), i.e., the fraction of the critical damping coefficient, is frequently defined to be equal to the ratio of the response at zero frequency divided by twice the response at the frequency of the 90° phase shift. By response characteristics I mean the amplitude of the excursion of the mass at various frequencies under a constant accelerating force. The response characteristics of the system of my invention described herein correspond to a system of one degree of freedom, whose suspended mass weighs many times that of the mass in the system of my invention, if they both have the same damped natural frequency.

I prefer to set the limits of the ratios of the reactances and resistances of the series gap and the auxiliary passageways according to the following criteria. By observing these criteria I may design the instrument having the desired damping ratio and damped natural frequency and desired frequency degradation, I may, by constructing the system so that the width of the series gap varies with changes in temperature, control and minimize the variations in the damping ratio arising from temperature changes.

These criteria are expressed by setting the various values as follows:

$$R_g = n_1(R_g + R_t) \quad (9)$$

where $n_1$ is equal to more than 0.5 and is less than unity and $$X_t = n_2(X_g + X_t) \quad (10)$$

where $n_2$ is more than 0.5 and less than unity.

The values of $n_1$ and $n_2$ may but need not be equal. Preferably I set the values of $n_1$ and $n_2$ so that they each may be chosen from values ranging from about 0.6 to about 0.95.

From Equation 8 it will be seen that:

$$h = \frac{1}{2}\left[\frac{R_t + \left(\frac{n_1}{1-n_1}\right)R_t}{X_t + \left(\frac{1-n_2}{n_2}\right)X_t}\right] = \frac{1}{2}\left(\frac{R_t}{X_t}\right)\left[\frac{n_2}{1-n_1}\right] \quad (11)$$

$$h = \frac{1}{2}\left[\frac{\left(\frac{1-n_1}{n_1}\right)R_g + R_g}{\left(\frac{n_2}{1-n_2}\right)X_g + X_g}\right] = \frac{1}{2}\left(\frac{R_g}{X_g}\right)\left[\frac{1-n_2}{n_1}\right] \quad (12)$$

In all of the above equations, the units are in the centigrade, gram seconds system. The practical maximum value of $n_1$ and $n_2$ will depend upon the minimum width and length of the series gap and the maximum equivalent radius and length of the auxiliary passageway which geometrical and practical machining considerations dictate. Further, the value of the damping ratio and, therefore, of the above ratios of resistances and reactances, is dictated by the use to which the device is to be put, as will be well understood by those skilled in the art.

By selecting the desired damping ratio, I may obtain the necessary ratio of the reactive component to the resistive component of the impedance of the series and of the auxiliary passageway. From Equation 6 I may obtain the values of "$Bd$" corresponding to the chosen ratio for the series gap; and from Equation 7 and the table and a graph prepared therefrom, I may obtain the values of "$Ba$" to give the damping ratio desired. Thus, for example, if I select $n_1 = n_2 = 0.7$ the damping ratio "$h$" to be equal to .7 of critical damping, $R_t/X_t = 0.6$, and "$Ba$" = 2.4, and $R_g/X_g = 3.3$, and "$Bd$" = 1.24.

If the damping be made some value higher than .7 of critical damping for like values of $n_1$ and $n_2$, the values of "$Ba$" and "$Bd$" are decreased accordingly; and if selected for some value of critical damping less than .7, then the values of "$Ba$" and "$Bd$" are increased accordingly, as is evident from the above equation. As indicated above, the values of $n_1$ and $n_2$ need not be equal but in such case the values of "$Ba$," "$Bd$" and $R_t/X_t$ and $R_g/X_g$ will also change as will appear from the foregoing.

In systems designed according to the above criteria, I find as in the case of systems of my copending application, that the natural frequency of the system may be varied by changing the length or radius of the tubular auxiliary passageway, thereby changing the dynamic mass of the system. The longer the tube and the greater the diameter, the lower the natural frequency, all other design parameters being constant.

As stated above, I may obtain an improvement in the stability of the damping ratio "$h$" on changes of temperature by making the series gap one whose value of "$d$" changes with temperature. I employ as an element of the gap material a material different coefficient of expansion than the complimentary surface of the gap, such that the gap decreases in width as the temperature increases and increases in width as the temperature falls. This compensates for changes in viscosity to maintain the damping coefficient more nearly constant.

The introduction of the temperature variable gap as a series gap has the advantage over the use of a variable parallel gap alone, in that the same variation in the width of the series gap produces a greater change in the damping ratio than would be the effect of the same change in width in the parallel gap in the absence of a series gap.

The above configurations of gaps and passageways, using gap spacing and auxiliary passageway diameters readily achievable in practice, permits of the use of low viscosity oils. The lower the viscosity of the oil, the smaller will be its variation of the viscosity with temperature. This also aids in reducing the variation of the damping ratio as the temperature of the oil changes.

These and other objects of my invention will be further described by reference to the drawings, in which.

Figure 1:
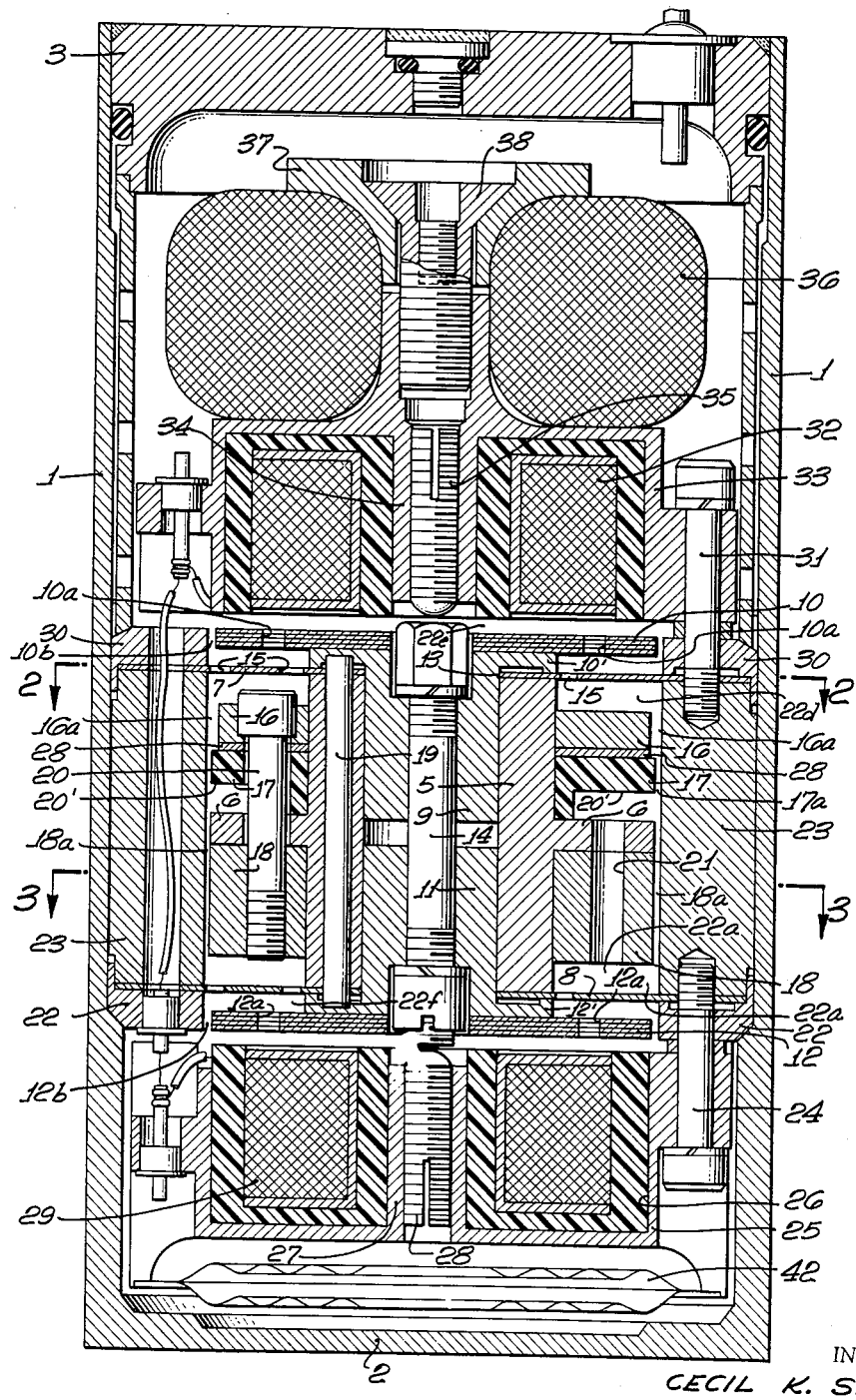
FIG. 1 is a vertical section taken on line 1—1 of FIG 2 of an accelerometer employing my invention, employing the series and parallel passageways.
Figure 2:
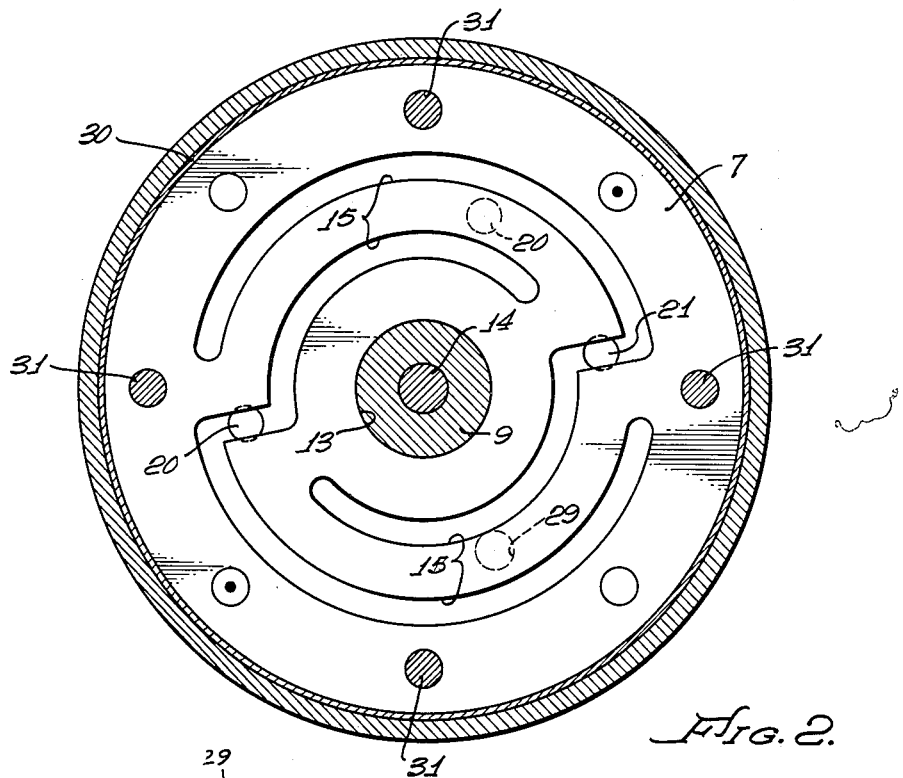
FIG. 2 is a section taken on line 2—2 of FIG. 1.
Figure 3:
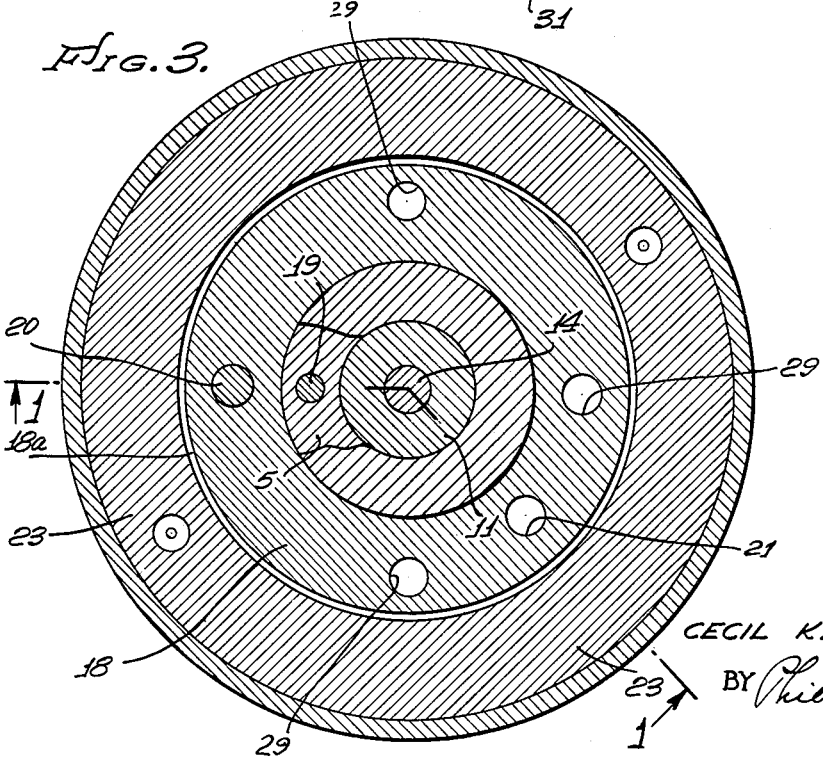
FIG. 3 is a section taken on line 3—3 of FIG. 1.

The accelerometer illustrated in FIG. 1 consists of a casing having a bottom 2 and a cover 3. The mass assembly is formed of the following elements. A laminated armature plate 10, bearing two diametrically positioned holes 10a, positioned on a grooved flange 10' which is carried on a stem 9 positioned in the internal bore of sleeve 5. The flat spring 7, carrying arcuate slots 15 and a central bore 13, is clamped between the flange 10' and an end of the sleeve 5. Central flange 6 on sleeve 5 carries the rings 16, 17 and 18 by means of cap screw 20. The lower end of the sleeve 5 carries a stem 11 with a grooved flange 12', similar to 9 and 10'. The orientation of the stems 9 and 11 and sleeve 5 is fixed by locating pin 19 which passes through bores in the stem 5, springs 7 and 8 and seats in receiving sockets in the flanges 10' and 12'. The spring 8 of construction similar to spring 7 is clamped between the end of 5 and the flange 12'.

The laminated armature 12 carrying bores 12a is carried on the flange 12' of stem 11. The circular plate armatures 10 and 12 are composed of laminated sheets of metal, each of which is surface oxidized and formed of metal of high magnetic permeability. The laminated construction and metal is similar to that used in transformer cores. The metal of 5, 6 and rings 18 and 16 are of high magnetic permeability and low coersive force. The flange 10', stem 9, spring 7, bolt 14, stem 11, flange 12′ and spring 8 are of low magnetic permeability. The ring 17 is notched to give an annular groove 20′ between the flange 6 and the ring 17. The ring 17 is made of plastic, e.g. polytetrafluoroethylene, sold by Du Pont de Nemours under the trademark Teflon, or polymonochlorodifluoroethylene sold under the trademark Kel–F, or any other moldable or machinable organic plastic material having a substantially larger temperature coefficient of expansion than the sleeve 23, which may be made of stainless steel, brass, or other suitable metal.

The mass assembly is held in position by the bolt 14 through suitable provided bores in 9 and 11. A bore 21 is provided through the ring 18 and the flange 6, the holes being in registry to give continuous passageway from the groove 20′ to the space 22a underneath the ring 18.

The spring 8 is clamped at its outer edges between the ring 22, seated on the internal shoulder of case 1 and the sleeve 23 by means of cap screws 24. The receiver 25 is formed with an annular groove 26 and a central boss 27, carrying a screw 28 which acts as a stop for the mass. The electro-magnet coil 29 held in a receiver 25 is mounted on the sleeve 23 by means of the cap screws 24. There are a plurality of these cap screws spaced about the periphery of the unit.

The spring 7 is clamped between the ring 30 and the sleeve 23 by means of cap screws 31. The electro-magnet coil 32 is mounted in the receiver 33 which is mounted on ring 30 by screws 31, which are threaded into the sleeve 23. There are a plurality of such screws positioned around the periphery of the unit. The central boss 34 of the receiver 33 carries a screw 35 which acts as a stop for the mass.

The armature 10′ is spaced from the core 34 and from the inner wall of the sleeve 23 by a gap 10b. The armature 12 is spaced from the core 27 and is spaced from the peripheral wall of the sleeve 23 by the annular gap 12b. The gap between the armatures and the coils 32 and 29 respectively are equal when the mass is positioned centrally between the two coils.

The magnetic circuit for each of the coils is around the receiver through the core and the outer peripheral wall of the annular groove across the gap and across the armature. A variation in position of the mass will increase the length of the gap for one coil and decrease it for the other, depending upon the direction of motion. This variation in the length of the gap will affect the inductance of each of the coils essentially equally for motions that are a small part of the air gap, and in opposite directions.

Positioned at the bottom of the transducer and held in position by the receiver 25 is a bellows 42 which is filled and sealed with ambient air at atmospheric pressure.

The figures of the drawings are intended to be illustrative and are not to be taken as indicating relative dimenisons of parts. The gaps 10b and 12b are sufficiently wide and short, and the holes 10a and 12a, the arcuate slots 15 and gap 16a between the ring 16 and the sleeve 23 are of sufficient width, and of such short length, and the space 22d, groove 20′, space 22a and 22d are of such dimensions that the impedance to flow of the liquid therethrough may be ignored for practical purposes. The parallel gap 18a is made to have a substantially higher flow impedance than that of the series gap 17a and the auxiliary passageway 21 so that substantially all of the flow is through the gap 17a and tube 21. The gap 17a is made of such width that the impedance to flow is predominantly resistive, as described above. The bore of the hole 21, as are the other geometric parameters of the device, is such that, including the length of the bore 21, at the viscosity of the oil employed, the impedance of flow through the bore 21 is predominantly inertial and sufficient to obtain the desired damping and damped natural frequency.

When the mass oscillates on a spring 7 and 8, oil moves from space 22a to 22d and vice versa, passing through the gap 17a and radially through 20′ and then through the bore 21 in parallel with the gap 18a and into the space 22a. As stated, the flow through 18a is preferably minimized. The dynamical characteristic of the instrument is dependent substantially entirely upon the mechanical system and primarily upon the series gap 17a and bore 21.

The case is filled with oil through a fill hole suitably provided in the case. A low viscosity oil such as a Dow Corning 200 or 500 fluid believed to be a silicone oil may be used. A suitably low kinematic viscosity may be employed. Oils as low as 0.65 and as high as 1000 centistokes are understood to be available. An oil of about 1 to 2 centistokes is suitable but others may be used as will be understood by those skilled in this art.

The variation in the width of the gap 17a is obtained by the differential expansion of ring 17 and sleeve so that the gap becomes narrower as the temperature rises and becomes wider as the temperature falls.

My invention of which the instrument described above is but one embodiment preferred for accelerometers of this configuration, will produce instruments whose damped natural frequency is of the desired small fraction of the undamped natural frequency and will have response characteristics similar to systems of one degree of freedom with like damping ratios at a selected temperature. It will also have the advantage that the damping ratio and damped natural frequency is maintained substantially constant.

While I have described a particular embodiment of my invention for the purpose of illustration, it should be understood that various modifications and adaptations thereof may be made within the spirit of the invention as set forth in the appended claims.

I claim:

1. A damped motion sensing device comprising a case, a member mounted on said case, a yieldable constraint connected to said member and said case to constrain the motion of said member in said case, a liquid in said case, said member immersed in said liquid, a plurality of passageways for said liquid adapted to permit flow of liquid in series through said passageways on oscillation of said member on said constraint, the resistive component of the impedance to flow in one of said passageways being equal to $n_1$ times the sum of the resistance components of the impedances to flow in said passageways wherein $n_1$ is greater than 0.5 and less than unity and the reactive component of the other of said passageways is equal to $n_2$ times the sum of the reactive components of the impedance to flow in said passageways when $n_2$ is greater than 0.5 and less than unity.

2. In the device of claim 1 in which said first mentioned one of said passageways is a peripheral gap between a peripheral wall of said member and a wall portion of said case.

3. In the device of claim 2 in which the member at said peripheral wall and said wall portion of said case have different coefficients of expansion whereupon said gap changes in width with changes in temperature.

4. A damped motion sensing device comprising a case, a member mounted in said case, a yieldable constraint connected to said member and to said case to constrain the motion of said member in said case, a liquid in said case, said member immersed in said liquid, said member being spaced from a wall portion in said case to form a peripheral gap, and a tubular passageway in series with said peripheral gap, a space in said case adjacent one end of said member, a second space in said case adjacent the other end of said member, adapted to permit flow of liquid from one of said spaces to the other space in series through said gap and tubular passageways on oscillation of said member on said constraint, the reactive component of the flow impedance to flow in said tubular passageway being equal to $n_2$ times the sum of the reactive components of the impedances to flow in said peripheral gap and tubular passageway, where $n_2$ is greater than 0.5 and less than 1.

5. In the device of claim 4 in which the member at said peripheral wall and said wall portion of said case have different coefficients of expansion whereupon said gap changes in width with changes in temperature.

6. A damped motion sensing device comprising a case, a member mounted in said case, a yieldable constraint connected to said member in said case to constrain the motion of said member in said case, a liquid in said case, said member immersed in said liquid in said case, a plurality of flow passageways for said liquid adapted to permit flow of liquid in series through said passageways on oscillation of said member on said constraint, where the resistive component of the flow impedance of one of said passageways is substantially larger than the reactive component of the flow impedance of said passageway, and the reactive component of the flow impedance of the other of said passageways is substantially larger than the reactive component of the flow impedance of the first one of said passageways at the natural frequency of said device.

7. In the device of claim 5 in which said first mentioned one of said passageways is a peripheral gap between a peripheral wall of said member and a wall portion of said case.

8. In the device of claim 6 in which the member at said peripheral wall and said wall portion of said case have different coefficients of expansion whereupon said gap changes in width with changes in temperature.

9. In the device of claim 5, wherein the resistive component of the impedance to flow in the first named of said passageways is equal to $n_1$ times the sum of the resistive components of the impedance to flow in said first mentioned and in said second mentioned passageway wherein $n_1$ is greater than 0.5 and less than unity.

10. In the device of claim 8 in which said first mentioned one of said passageways is a peripheral gap between a peripheral wall of said member and a wall portion of said case.

11. In the device of claim 9 in which the member at said peripheral wall and said wall portion of said case have different coefficients of expansion whereupon said gap changes in width with changes in temperature.

12. In the device of claim 5 wherein the reactance component of the impedance to flow and the last named of said passageways being equal to $n_2$ times the sum of the reactive components of the impedances to flow in both of said passageways, where $n_2$ is greater than 0.5 and less than 1.

13. In the device of claim 11 in which said first mentioned one of said passageways is a peripheral gap between a peripheral wall of said member and a wall portion of said case.

14. In the device of claim 12 in which the member at said peripheral wall and said wall portion of said case have different coefficients of expansion whereupon said gap changes in width with changes in temperature.

15. In the device of claim 6, wherein the resistance components of the impedance to flow in the first mentioned one of said passageways being equal to $n_1$ times the sum of the resistive components of the impedance to flow in both of said passageways where $n_1$ is greater than 0.5 and less than unity and wherein the reactive components of the impedance to flow in the last named of said passageways is equal to $n_2$ times the sum of the reactive components of the impedance to flow in both of said passageways where $n_2$ is greater than 0.5 and less than 1.

16. In the device of claim 15 in which said first mentioned one of said passageways is a peripheral gap between a peripheral wall of said member and a wall portion of said case.

17. In the device of claim 16 in which the member at said peripheral wall and said wall portion of said case have different coefficients of expansion whereupon said gap changes in width with changes in temperature.

18. A damped motion sensing device comprising a case, a member mounted in said case, a yieldable constraint connected to said member and said case to constrain the motion of said member in said case, a liquid in said case, said member immersed in said liquid in said case, a first peripheral wall section of said member spaced from a first wall portion in said case to form a first gap, a second gap between a second peripheral wall section of said member and a second wall section of said case, an auxiliary passageway in parallel with said second gap and in series with said first mentioned gap, liquid in said case whereby the liquid moves in parallel between said second named gap and said auxiliary passageway and in series with said first named gap on oscillation of said member in said gaps and in which the flow impedance of said second-named gap is substantially higher than through said first-mentioned gap and said auxiliary passageway, and in which the resistive component of the flow impedance of said first-named gap is substantially higher than the resistive component of the flow impedance of said auxiliary passageway, and the reactive component of the flow impedance of said auxiliary passageway is substantially higher than the reactive component of the flow impedance of said first-mentioned gap at the natural frequency of said device.

19. In the device of claim 18 in which said first mentioned one of said passageways is a peripheral gap between a peripheral wall of said member and a wall portion of said case.

20. In the device of claim 19 in which the member at said peripheral wall and said wall portion of said case have different coefficients of expansion whereupon said gap changes in width with changes in temperature.

21. In the device of claim 18 wherein the flow resistance of said second named gap is from 5 to $10^2$ times the flow resistance through said auxiliary passageway and said second named gap in parallel.

22. In the device of claim 21 in which said first mentioned one of said passageways is a peripheral gap between a peripheral wall of said member and a wall portion of said case.

23. In the device of claim 22 in which the member at said peripheral wall and said wall portion of said case have different coefficients of expansion whereupon said gap changes in width with changes in temperature.

24. In the device of claim 21 wherein the resistive component of the impedance to flow in the first gap is equal to $n_1$ times the sum of the resistive components of the impedance to flow in said first gap and in said second auxiliary passageway wherein $n_1$ is greater than 0.5 and less than unity.

25. In the device of claim 24 in which said first mentioned one of said passageways is a peripheral gap between a peripheral wall of said member and a wall portion of said case.

26. In the device of claim 25 in which the member at said peripheral wall and said wall portion of said case have different coefficients of expansion whereupon said gap changes in width with changes in temperature.

27. In the device of claim 21 wherein the reactance component of the impedance to flow in said auxiliary passageways being equal to $n_2$ times the sum of the reactive components of the impedances to flow in said first gap and in said auxiliary passageways where $n_2$ is greater than 0.5 and less than 1.

28. In the device of claim 27 in which said first mentioned one of said passageways is a peripheral gap between a peripheral wall of said member and a wall portion of said case.

29. In the device of claim 28 in which the member at said peripheral wall and said wall portion of said case have different coefficients of expansion whereupon said gap changes in width with changes in temperature.

30. In the device of claim 21, wherein the resistance component of the impedance to flow in the first mentioned gap is equal to $n_1$ times the sum of the resistance component of the impedance to flow in said first gap and in said auxiliary passageway where $n_1$ is greater than 0.5 and less than unity and wherein the reactance component of the impedance to flow in the said auxiliary passageways is equal to $n_2$ times the sum of the reactance components of the impedance to flow in said first gap and in said auxiliary passageways where $n$ is greater than 0.5 and less than 1.

31. In the device of claim 30 in which said first mentioned one of said passageways is a peripheral gap between a peripheral wall of said member and a wall portion of said case.

32. In the device of claim 31 in which the member at said peripheral wall and said wall portion of said case have different coefficients of expansion whereupon said gap changes in width with changes in temperature.

References Cited in the file of this patent
UNITED STATES PATENTS

| | | |
|---|---|---|
| 1,407,320 | Bouche | Feb. 21, 1922 |
| 1,897,873 | Timson | Feb. 14, 1933 |
| 2,332,994 | Draper et al. | Oct. 26, 1943 |
| 2,742,113 | O'Connor | Apr. 17, 1956 |
| 2,777,544 | O'Connor | Jan. 15, 1957 |
| 2,821,268 | Carbon | Jan. 28, 1958 |
| 2,942,474 | Statham | June 28, 1960 |
| 2,945,378 | Martin | July 19, 1960 |